United States Patent [19]

Holmes

[11] Patent Number: 4,547,104
[45] Date of Patent: Oct. 15, 1985

[54] TAP

[76] Inventor: Horace D. Holmes, 28576 Green Willow, Farmington Hills, Mich. 48024

[21] Appl. No.: 515,783

[22] Filed: Jul. 21, 1983

Related U.S. Application Data

[62] Division of Ser. No. 258,221, Apr. 27, 1981.

[51] Int. Cl.[4] .............................................. B23G 5/06
[52] U.S. Cl. .................................. 408/220; 10/141 R; 408/222
[58] Field of Search ................... 409/65; 408/219, 220, 408/221, 222, 229; 10/141 R; 411/311, 285

[56] References Cited

U.S. PATENT DOCUMENTS

| 17,655 | 6/1857 | Richards | 408/222 X |
| 250,728 | 12/1881 | Harvey | 10/141 R |
| 586,419 | 7/1897 | Collet | 408/222 X |
| 2,116,036 | 5/1938 | Money | 408/222 X |
| 4,074,950 | 2/1978 | Holmes | 10/141 R |
| 4,181,457 | 1/1980 | Holmes | 408/222 |
| 4,341,497 | 7/1982 | Downey et al. | 411/311 |

FOREIGN PATENT DOCUMENTS

| 617052 | 2/1927 | France | 10/141 |
| 237562 | 11/1969 | U.S.S.R. | 408/229 |
| 466931 | 8/1975 | U.S.S.R. | 10/141 R |

OTHER PUBLICATIONS

"E Lok Thread"-World of Self-Locking Screws . . . ", Product Engineering, Apr. 1979, pp. 55-59.

Primary Examiner—William R. Briggs
Attorney, Agent, or Firm—Krass and Young

[57] ABSTRACT

A self-locking fastener includes a male member, such as a bolt, having a standard, helical, male thread of constant diameter which is deformed by the special female locking threads of a female member, such as a nut. The female threads are defined by leading and trailing flanks which converge to provide a truncated root that frictionally engages and deforms a portion of the male crest. The trailing flanks of the male and female threads are inclined at the same angle and frictionally engage each other throughout their entire depth. The leading flanks of the male and female threads diverge away from each other to provide a space adjacent the truncated female root for receiving the deformed portion of the male crest therewithin. The deformed portion of the male crest and the full engagement of the trailing flanks produces firm metal-to-metal contact between the members throughout the entire length of the female thread, thereby procluding lateral movement of one member relative to the other. A tapping tool having a male thread which is the mirror image of the female thread to be formed is employed to produce the thread form in the female member.

3 Claims, 5 Drawing Figures

*Fig-3*
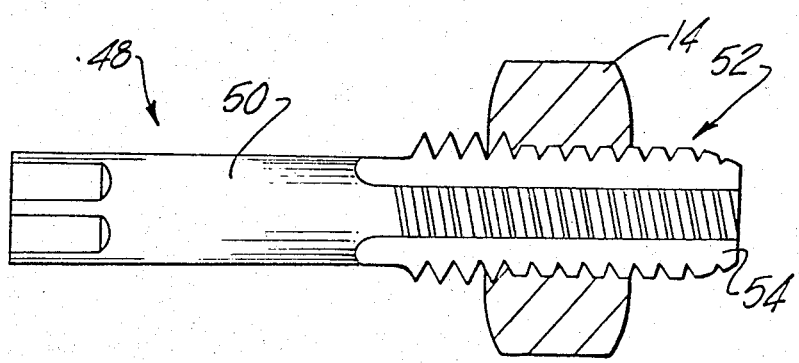
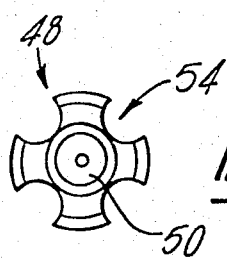
*Fig-4*
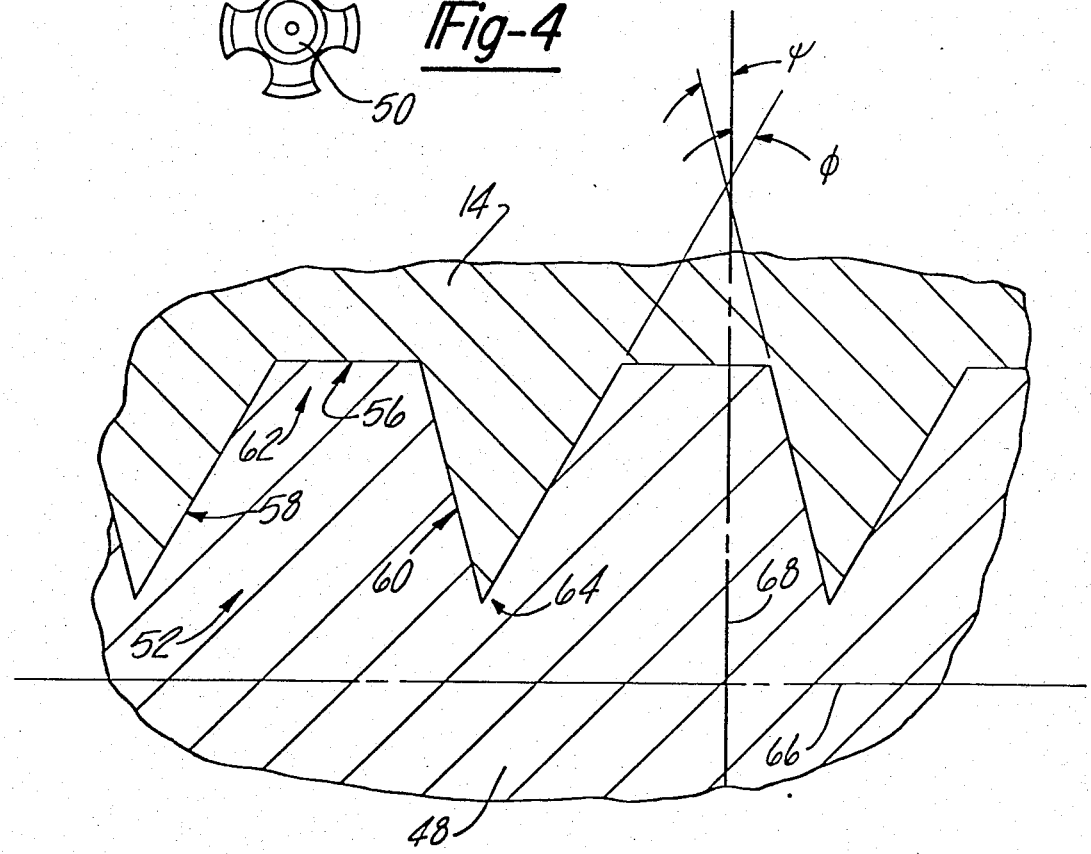
*Fig-5*

TAP

This application is a division of application Ser. No. 258,221, filed 4/27/81.

TECHNICAL FIELD

The present invention generally relates to locking fasteners of the threaded type, and deals more particularly with a male and female thread construction in which the male thread is deformed during mating of the members to produce locking of the fastener.

BACKGROUND ART

Standard manufacturing tolerances inherent in the threaded portions of conventionally threaded fasteners result in small air spaces between the mated male and female threads which allow the fastener combination to shift laterally or "rock" when subjected to vibration or shock. This lateral movement of the threads is sufficient to overcome starting friction between those portions of the threads which are in frictional contact with each other. When the fastener is tightened, a substantial amount of potential energy is stored in the threads (due to stresses), which is transformed in kinetic energy as the threads laterally shift with respect to each other, thereby unlocking the threads and loosening the fastener. This undesirable situation is particularly acute in assemblies which are subjected to constant vibration, such as steering assemblies, drivetrains, engines, etc.

Numerous locking thread constructions have been devised in the past in an effort to overcome the problems mentioned above. Some of these past attempts have involved the forming of the threads during the assembly process in order to increase friction between the male and female threads. For example, one typical locking thread construction is shown in my prior U.S. Pat. No. 4,150,702 which discloses a fastener combination in which conventional male threads are deformed when mated with a special female thread. Although this previous fastener combination is suitable for many applications, it is less than completely desirable in some cases since not all of the male threads mating with the female threads are deformed. Additionally, the amount of surface contact between the male and female threads is limited to that portion of the male threads which is in fact deformed, i.e., substantial flank-to-flank contact is not achieved.

Accordingly, it is a primary object of the present invention to provide a self-locking fastener which eliminates lateral or radial type movement of the threads relative to each other, in which tight frictional engagement is achieved between the male and female threads throughout the entire length of the female thread.

Another object of the invention is to provide a fastener of the type described above in which a portion of the male thread is deformed when the fastener members are assembled, but yet which also provides firm frictional engagement between one pair of opposing flanks of the male and female thread.

Another object of the invention is to provide a fastener of the type described above which eliminates the need for close manufacturing tolerances for the threads and which employs a standard male thread of constant diameter.

These, and further objects of the invention, will be made clear or will become apparent during the course of the detailed description thereof set out below.

DISCLOSURE OF THE INVENTION

In accordance with the present invention a self-locking fastener assembly comprises a male member, such as a bolt, having a standard helical male thread of constant diameter and a female member provided with a special, locking, female thread threadably mateable with the male thread to produce an interference fit in which a portion of the male thread is deformed to assure firm metal-to-metal contact between the mating threads. The female thread is defined by leading and trailing flanks which converge to provide a truncated root which frictionally engages, and deforms a portion of a male crest defined by leading and trailing flanks of the male thread. The trailing flanks of the male and female threads are inclined at the same angle in order to produce firm frictional engagement with each other essentially throughout their depth. The leading flanks of the male and female threads diverge away from each other to define a space adjacent the truncated female root for receiving the deformed portion of the male crest therewithin. In the preferred form of the invention, the angle of divergence between the leading flanks of the male and female threads is between about 5 and 20 degrees. The female thread is produced by a tapping tool having a male thread thereon which is a complement of the female thread to be formed.

BRIEF DESCRIPTION OF THE DRAWINGS

In the drawings, which form an integral part of the specification and are to be read in conjunction therewith, and in which like components are designated by identical reference numerals in the various views:

FIG. 3 is a longitudinal view of a tool for producing the female thread in the female member, and shown in operative relationship to a female member being tapped;

FIG. 4 is a view of one end of the tool shown in FIG. 3; and

FIG. 5 is an enlarged view of the thread on the tool shown in FIGS. 3 and 4, in operative relationship to the female member being tapped.

BEST MODE FOR CARRYING OUT THE INVENTION

Figure 1:
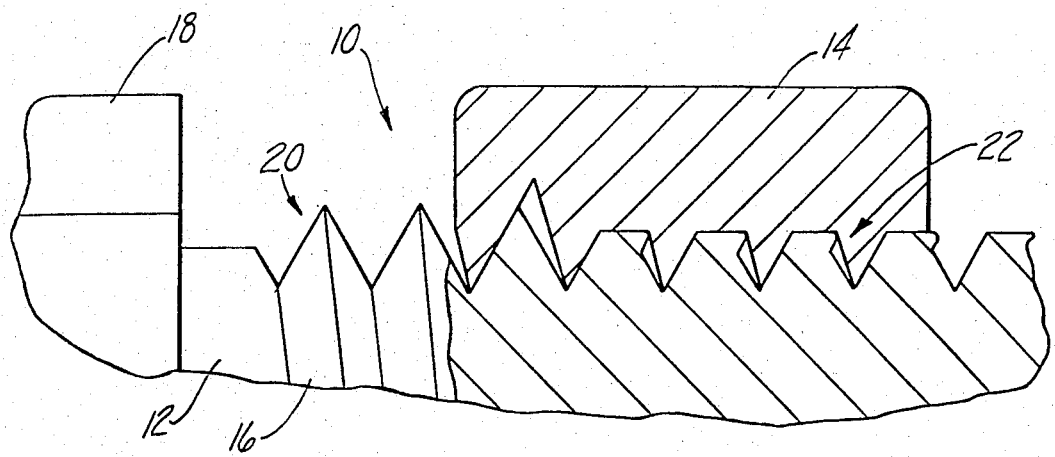
FIG. 1 is a fragmentary longitudinal view of a fastener assembly which forms the preferred embodiment of the present invention, parts of the male and female members being broken away in section to reveal the mating thread forms.
Figure 2:
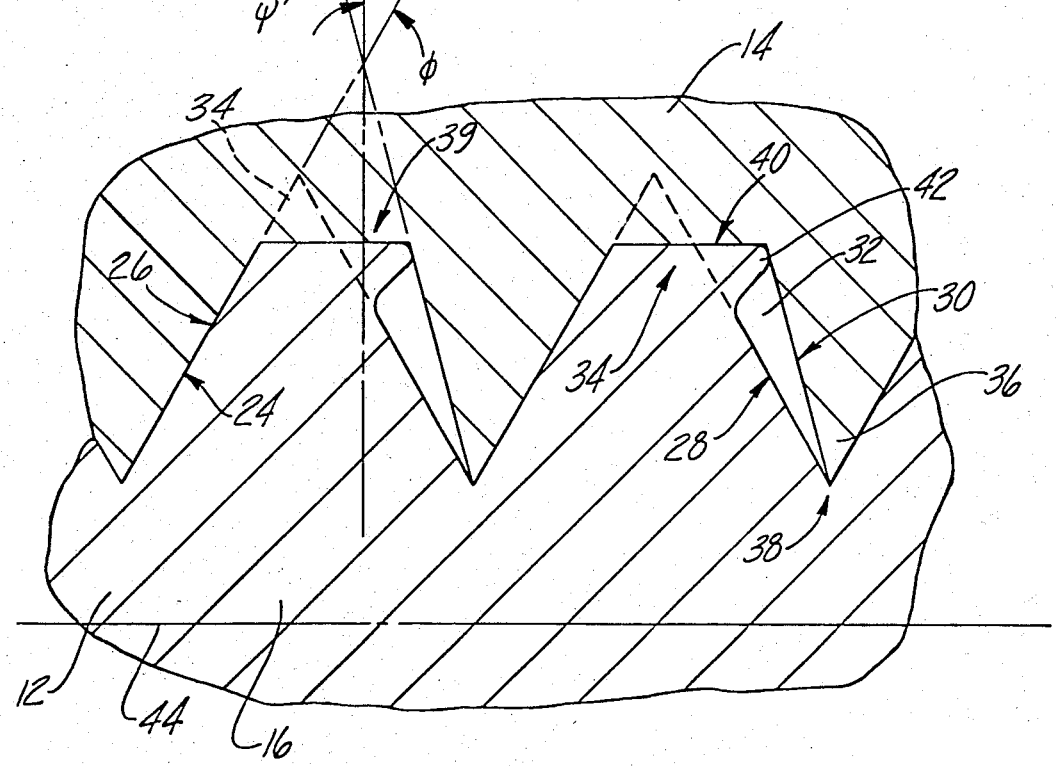
FIG. 2 is an enlarged view of the mating thread forms shown in FIG. 1.

Referring first to FIGS. 1 and 2, the present invention is generally concerned with a fastener assembly, generally indicated by the numeral 10, which includes a threaded male member, such as a bolt 12 threadably coupled with a threaded female member, such as nut 14. Although the bolt 12 and nut 14 are shown in the drawings for purposes of simplicity, it may be appreciated that the male member may comprise a threaded stud formed integral with a larger part, while the female member may comprise a tapped hole in a part.

The bolt 12 is provided with a head 18 adapted to receive a wrench or the like, and an elongated shank 16 extending outwardly from the head 18. Shank 16 is provided with a helical, male thread 20 formed thereon. Male thread 20 is defined by trailing and leading flanks 24 and 28 respectively which converge to define a male thread crest 34 and male thread root 38. The trailing and leading flanks 24 and 28 are inclined relative to the longitudinal axis 44 of the shank 16 at substantially the same angle, throughout the entire length of the male thread 20. Thus, male thread 20 is of a standard type which is symmetric in cross-section, i.e. the thread is symmetric about a reference line extending normal to axis 44 and passing through the intersection of the trailing and leading flanks 24 and 28 respectively.

The nut 14 comprises a cylindrically shaped body having a hole therethrough and within which a special female thread 22 is defined. The female thread 22 is defined by trailing and leading flanks 26 and 30 respectively which converge to form a female root 39 at the outer diameter of the thread 22, and a female crest 36 near the inner diameter of thread 22. The female root 39 receives the male crest 34 therein, while the female crest 36 is received with male root 38.

The female thread 22 is of an asymmetric type in which the trailing and leading flanks 26 and 30 are inclined at differing angles relative to the longitudinal axis 44 and are asymmetrically disposed about an axis 46 which extends normal to axis 44 and passes through the point of intersection of flanks 26 and 30 defined by extension lines 26a and 30a. The leading flank 26 is inclined with respect to axis 46 at an angle $\phi$, while the leading flank 30 is inclined with respect to axis 46 at an angle $\psi$. It may be readily appreciated that angles $\phi$ and $\psi$ are directly proportional to the inclination of flanks 26 and 30 relative to the longitudinal axis 44. Angle $\psi$ is within the range of 10 to 20 degrees, and preferably approximately 15 degrees. Also, in the preferred form of the invention, the angle $\phi$ exceeds angle $\psi$ by an amount which is the range of 5 to 20 degrees; the maximum, however, is approximately 25 degrees. In any event, the trailing flanks 24 and 26 of the respective threads 20 and 22 are inclined at the same angle relative to each other, while the leading flanks 28 and 30 diverge radially outward, away from each other. Since the male thread 20 is symmetric, it may be appreciated that the angle between the leading flanks 28 and 30 is equal to the difference between the angles $\phi$ and $\psi$, i.e. 5 to 20 or 25 degrees in the preferred form. The female root 39 is truncated by an essentially flat root surface 40 which extends transversely between the trailing and leading flanks 26 and 30. The outside diameter of the male thread 20 exceeds that of the female thread 22. In other words, the distance between the longitudinal axis 44 and the male crest 34 is greater than that between axis 44 and root surface 40. The divergence of leading flanks 28 and 30 produces a space 32 adjacent the female root 39 for purposes which will become later apparent.

In use, the nut 14 is threaded onto the outer end of shank 16 with the necessary amount of prevailing torque; as the male crest 34 engages the root surface 40 a portion of the crest 34 is deformed laterally at 42 into the space 32 and firmly engages both the root surface 40 and a portion of the leading flank 30. The trailing flanks 24 and 26 are in substantially tight, frictional engagement with each other, substantially throughout their entire depth as a result of axial tension imposed on the threads 20,22 during the threading process. The threading process is continued until the nut 14 reaches the desired location along the length of shank 16. From the above, it may be appreciated that the total surface area of frictional contact between the male and female threads 20 and 22 consists of the area of face-to-face engagement between the leading flanks 24 and 26 in addition to that part of the male crest engaging root surface 40 and outer portions of the leading flank 30. By virtue of the fact that the major diameter of the male thread 20 exceeds that of the female thread 22, lateral stability between bolt 12 and nut 14 is assured since the female root 39 is completely filled by the male crest 34. Longitudinal stability is also assured since the trailing flanks 24 and 26 tightly engage each other on one side of the female thread 22 while the deformed portion 42 firmly engages the leading flank 30.

Referring now also to FIGS. 3–5, the female thread 22 may be formed in the nut 14, or other part, by a tapping tool generally indicated at 48. Tapping tool 48 includes an elongate, generally cylindrical body 50 having a male thread 52 formed on one extremity thereof. Male thread 52 is essentially a mirror image of female thread 22 and is defined by trailing and leading flanks 58 and 60 which converge to form a crest 62 and root 64. The crest 62 is truncated by flat 56 which extends transversely between the trailing and leading flanks 58 and 60. Flanks 58 and 60 are inclined at different angles relative to the longitudinal axis 66 of body 50, consequently the male thread 52 is asymmetric in cross-section. As shown in FIG. 5, trailing flank 58 is inclined relative to a line 68 which is normal to axis 66 at an angle $\phi$ which is greater in magnitude than the angle $\psi$ between lines 68 and flank 60. As in the case of the female thread 22, the difference between angles $\phi$ and $\psi$ may range from about 5 to about 25 degrees. Body 50 may include a plurality of circumferentially spaced, longitudinally extending slots 54 in the surface thereof which interrupt the male thread 52 in order to accommodate metal cuttings generated during the tapping process.

As indicated in FIGS. 1 and 3, it is advantageous to include one or two full depth threads in the nut to start the engagement of the nut and bolt. This is accomplished by including a full height portion on the tap 48 and running the tap into the nut a controlled distance.

As will be apparent to those skilled in the art, the thread forms are shown in somewhat idealized form, i.e., the sharp peaks and valleys are not as distinct in actual practice nor are the fits as perfect as shown due to tolerances and limitations of actual mechanical components.

Finally, the terms "leading" and "trailing" are arbitrary, but "trailing" is selected to designate the flanks which converge under axial load.

From the foregoing, it may be appreciated that the self-locking fastener and tool for making same described above not only provide for the reliable accompishment of the objects of the invention but do so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:
1. A tool for forming a female thread, comprising:
an elongate body having a pilot end and working length, the working length including the first portion proximate the pilot end and having a helical male thread formed thereon, said male thread being defined by leading and trailing flanks converging radially outward from the longitudinal axis of said body at respective first and second angles of inclination relative to a line normal to said longitudinal axis and forming a thread crest, said thread crest being truncated to define a flat at the outer periphery of said thread crest, said flat extending transversely between said leading and trailing flanks and parallel to said longitudinal axis, said first angle being less in magnitude than said second angle, the leading flank being inclined relative to said longitudinal axis at an angle greater than the corresponding flank of a standard thread form of substantially identical pitch and diameter, said trailing flank being inclined relative to said longitudinal axis at an angle which is substantially the same as the corresponding flanks of said standard thread form, the working length further having a second portion proximate the first portion but remote from the pilot end also having a helical male thread formed thereon and being defined by leading and trailing flanks lying at said respective first and second angles of inclination relative to said longitudinal axis but rising to a radial height which is substantially greater than that of the truncated crest of said first portion, whereby turning said tap into a female fastener body results in a female thread form having first and second portions of common root radius but differing thread depths.

2. The tool of claim 1, wherein the difference in the magnitude of said first and second angles is in the range of approximately 5 to 25 degrees.

3. The tool of claim 2, wherein said leading and trailing flanks converge to define a thread root, the diameter of the thread root and the diameter of said thread crest being substantially constant in magnitude throughout the at least a portion of length of said thread.

* * * * *